(12) United States Patent
Grady et al.

(10) Patent No.: US 8,379,944 B2
(45) Date of Patent: Feb. 19, 2013

(54) IDENTIFICATION, CLASSIFICATION AND COUNTING OF TARGETS OF INTEREST IN MULTISPECTRAL IMAGE DATA

(75) Inventors: Leo Grady, Yardley, PA (US); Lance Anthony Ladic, Monmouth Junction, NJ (US)

(73) Assignee: Siemens Healthcare Diagnostics Inc., Tarrytown, NY (US)

( * ) Notice: Subject to any disclaimer, the term of this patent is extended or adjusted under 35 U.S.C. 154(b) by 1002 days.

(21) Appl. No.: 12/409,659

(22) Filed: Mar. 24, 2009

(65) Prior Publication Data

US 2009/0268966 A1 Oct. 29, 2009

Related U.S. Application Data

(60) Provisional application No. 61/048,714, filed on Apr. 29, 2008.

(51) Int. Cl.
*G06K 9/00* (2006.01)

(52) U.S. Cl. ........ 382/128; 382/129; 382/133; 382/134; 382/191

(58) Field of Classification Search .................. 382/128, 382/129, 133, 134, 191
See application file for complete search history.

(56) References Cited

U.S. PATENT DOCUMENTS

| | | | |
|---|---|---|---|
| 6,738,502 B1 * | 5/2004 | Coleman et al. | 382/133 |
| 6,768,820 B1 * | 7/2004 | Yakhini et al. | 382/289 |
| 6,958,811 B2 * | 10/2005 | Wolleschensky et al. | 356/326 |
| 7,555,155 B2 * | 6/2009 | Levenson et al. | 382/133 |
| 7,796,815 B2 * | 9/2010 | Muschler et al. | 382/173 |
| 2003/0036855 A1 * | 2/2003 | Harris et al. | 382/128 |
| 2004/0086873 A1 * | 5/2004 | Johnson et al. | 435/6 |
| 2005/0065440 A1 * | 3/2005 | Levenson | 600/476 |
| 2005/0265588 A1 * | 12/2005 | Gholap et al. | 382/128 |
| 2007/0248268 A1 * | 10/2007 | Wood | 382/195 |

OTHER PUBLICATIONS

Erik Meijering and Gert van Cappellen, "Quantitative Biological Image Analysis", Imaging Cellular and Molecular Biological Functions, Principles and Practice, 2007, vol. 1, pp. 45-70.*

Pilar Garcia Peñarrubia, Xavier Férez Ruiz and Jesús Gálvez, "Quantitative Analysis of the Factors That Affect the Determination of Colocalization Coefficients in Dual-Color Confocal Images", IEEE, Transactions on Image Processing, vol. 14, No. 8, Aug. 2005, pp. 1151-1158.*

Ahmed W M et al: "State of the Art Information Extraction and Quantitative Analysis for Multimodality Biomolecular Imaging" vol. 96, No. 3, Mar. 1, 2008, pp. 512-531 XP011204269 ISSN: 0018-9219; Magazine.

George T C et al: "Quantitative measurement of nuclear translocation events using similarity analysis of multispectral cellular images obtained in flow" Journal of Immunological Methods, Elsvier vol. 311, No. 1-2, Apr. 20, 2006, pp. 117-129, XP025158103; Magazine.

Michael L Huebschman et al: "Single-Pass Multispectral Imaging Enables Applications Ranging from Whole-Chromosome Painting to Gene Mapping" IEEE Engineering in Medicine and Biology Magazine, IEEE Service Center, Piscatatway, NJ, US, vol. 21, No. 4, Jul. 1, 2002, pp. 104-117, XP011093220; Magazine.

Leo Grady, Random Walks for Image Segmentation, IEEE PAMI, 28(11): 1768-1783, Nov. 2006.

Xiaojin Zhu, et al., Semi-Supervised Learning Using Gaussian Fields and Harmonic Functions. In Machine Learning: Proceedings of the Twentieth International Conference, Internation Conference on Machine Learning, pp. 912-919, 2003.

*Primary Examiner* — Eric Rush

(57) ABSTRACT

An imaging system for detecting targets of interest (TOIs) in multispectral imaging data includes a memory device storing a plurality of instructions embodying the system for detecting TOIs, a processor for receiving the multispectral imaging data and executing the plurality of instructions to perform a method including determining a list of events collocated across images of the multispectral imaging data and labeling each event as one of a TOI or non-TOI.

15 Claims, 3 Drawing Sheets

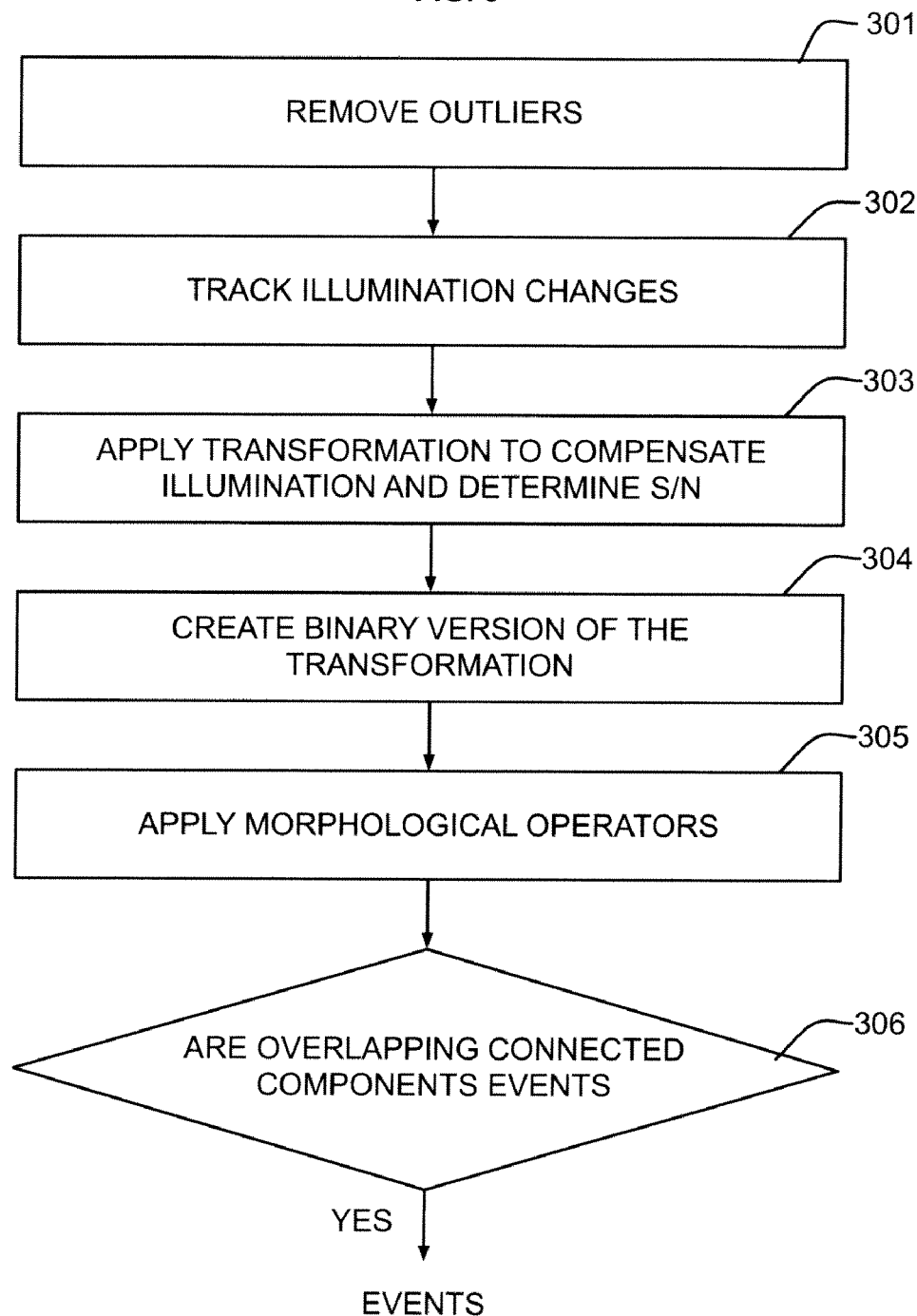

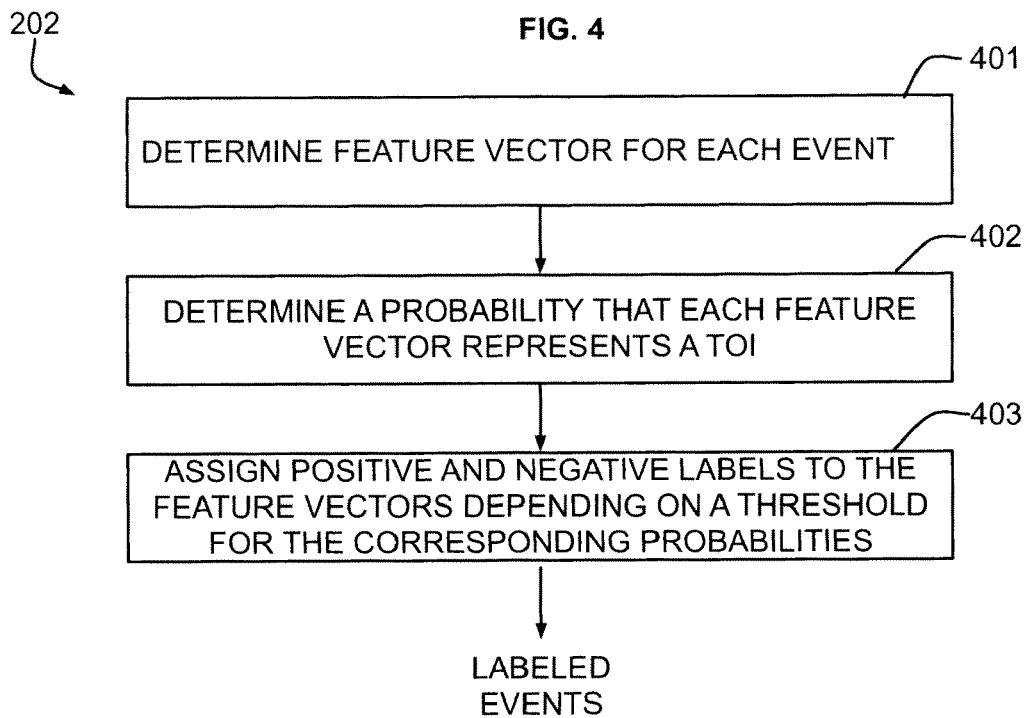
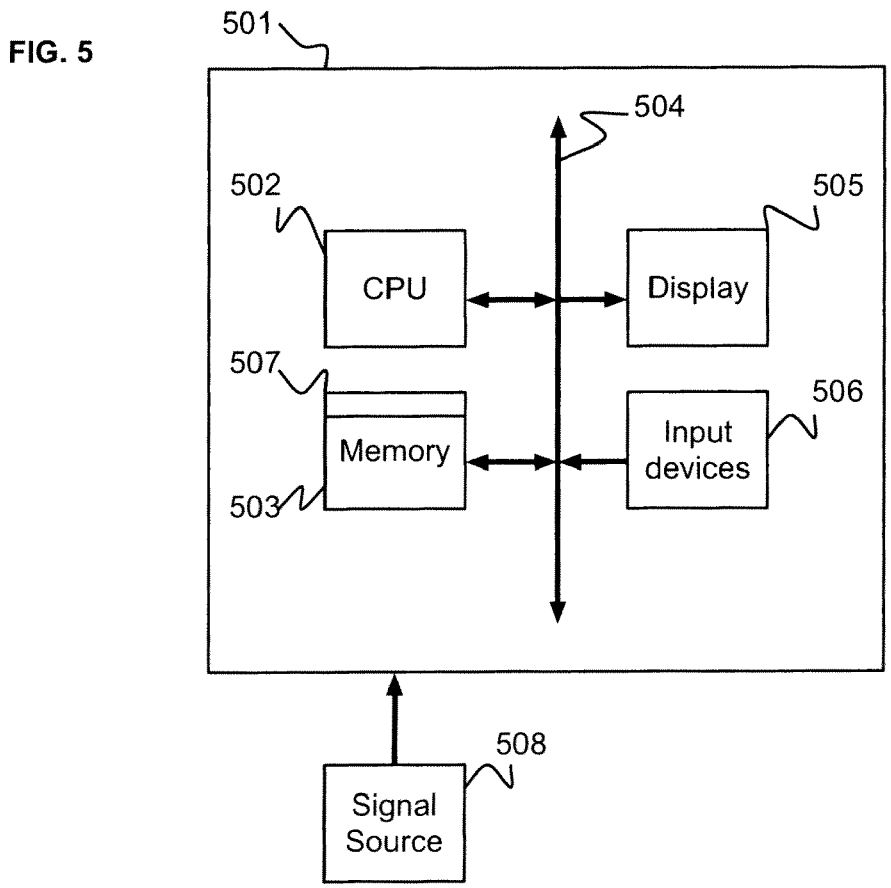

IDENTIFICATION, CLASSIFICATION AND COUNTING OF TARGETS OF INTEREST IN MULTISPECTRAL IMAGE DATA

CROSS-REFERENCE TO RELATED APPLICATIONS

This application claims the benefit of Provisional Application No. 61/048,714 filed on Apr. 29, 2008, the content of which is herein incorporated by reference in its entirety.

BACKGROUND

1. Technical Field

The present disclosure relates to image analysis, and more particularly to systems and methods for identification of targets in multispectral imaging data.

2. Discussion of Related Art

Multispectral fluorescence imaging techniques, such as fluorescence microscopy and bioluminescence, provide a mechanism for visualizing and studying molecular targets both in vitro and in vivo. These optical imaging technologies have several biomedical applications, including the diagnosis and monitoring of disease, studying the effects of drug candidates on target pathologies, and the discovery and development of biomarkers.

In multispectral fluorescence imaging, multiple targets of interest (TOIs) in a specimen are each specifically labeled with a fluorophore, which is a fluorescent molecule. The specimen is illuminated with light of a specific wavelength(s), which is absorbed by the fluorophores, causing the fluorophores to emit different wavelengths of light (e.g., longer wavelengths). These different wavelengths correspond to a different color than the absorbed light. The illumination light is separated from the weaker emitted fluorescence through the use of an emission filter. Multiple filters may be used to differentiate between the emissions of the fluorophores. The filtered emitted light for each fluorophore is converted into a digital image corresponding to a labeling pattern of the fluorophore within the specimen. The images acquired typically include intensity data, where the intensity of each pixel (e.g., on a scale of black to white) represents a level of fluorescence detected at that point in the specimen.

In multispectral fluorescence imaging, using W emission filters generates W corresponding images to output one image per fluorophore. Since the image acquisition is typically rapid, the W images may be registered to within a few pixels.

Labeled TOIs in multispectral fluorescence imaging data emit light at narrow, specific wavelengths that exclude emission from other components in the specimen. Many specimens (including samples of biological origin) frequently contain unpredictable material with which the fluorophores may bind, causing emission that passes through the specific filter, producing spurious intensity in the image. Additionally, some specimens exhibit inherent fluorescence that can be detected at the target emission wavelengths. Such situations could result in a false prediction of the presence of the TOIs. Additionally, several factors such as noise, occlusion, photobleaching, etc., can prevent a TOI from emitting a sufficient amount of light at the detected emission wavelength.

Therefore, a need exists for a system and method for distinguishing an emission indicating the presence of the TOIs from an emission that does not indicate the presence of the TOIs.

BRIEF SUMMARY

According to an embodiment of the present disclosure, an imaging system for detecting targets of interest (TOIs) in multispectral imaging data includes a memory device storing a plurality of instructions embodying the system for detecting TOIs, a processor for receiving the multispectral imaging data and executing the plurality of instructions to perform a method including determining a list of events collocated across images of the multispectral imaging data and labeling each event as one of a TOI or non-TOI.

According to an embodiment of the present disclosure, a method for detecting targets of interest (TOIs) in multispectral imaging data, the method includes determining a list of events collocated across images of the multispectral imaging data and labeling each event as one of a TOI or non-TOI.

BRIEF DESCRIPTION OF THE DRAWINGS

The invention will now be elucidated by reference to the embodiment partially illustrated schematically in the drawings regarding an exemplary medical application scenario using a favorable hardware set-up:

FIG. 3 is a flowchart of a method for event finding according to an embodiment of the present disclosure;

FIG. 4 is a flowchart of a method for classifying emission events according to an embodiment of the present disclosure;

FIG. 5 is a diagram of a computer system for identification of targets in multispectral imaging data according to an embodiment of the present disclosure.

DETAILED DESCRIPTION OF PREFERRED EMBODIMENTS

According to an embodiment of the present disclosure, a system and method are described for identifying, classifying and counting targets of interest (TOIs) in multispectral fluorescence imaging data. It should be noted that the material described herein can be applied to TOI detection/discrimination in any multichannel image, not just fluorescence imaging. The system and method may be conceptualized as including two parts: an event finder 101 for producing a list of events that are collocated across images and a classifier 102 for determining whether or not each event is a TOI (see FIG. 1).

Figure 2:
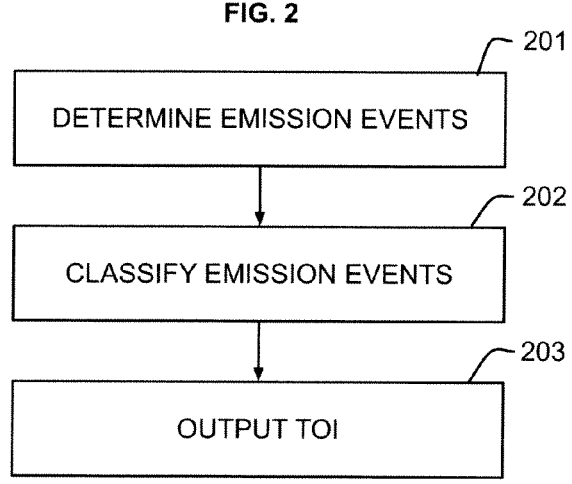
FIG. 2 is a flowchart of a method for detecting targets of interest in imaging data according to an embodiment of the present disclosure.

Referring to FIG. 2, according to an embodiment of the present disclosure, emission events are determined across images collected through the use of different emission filters (e.g., the same structure is labeled with different fluorophores) (201) and a classified (202) to determine whether or not these co-localized regions represent TOIs (203).

Embodiments of the system and method can distinguish emissions that indicate the presence of the TOIs from emissions that do not indicate the presence of the TOIs. Embodiments of the system and method include components for finding candidate events and classifying the events into true TOIs and false TOIs. Although traditional classification methods are widespread and effective, it is often difficult to adequately train a classifier since most images contain a mix of true/false events (which can be difficult to distinguish by the human eye) for which only an overall positive/negative label is assigned, e.g., obtained independently through a different diagnostic test.

According to an embodiment of the present disclosure, a method includes an event finder (201) and a classification routine (202).

Figure 1:
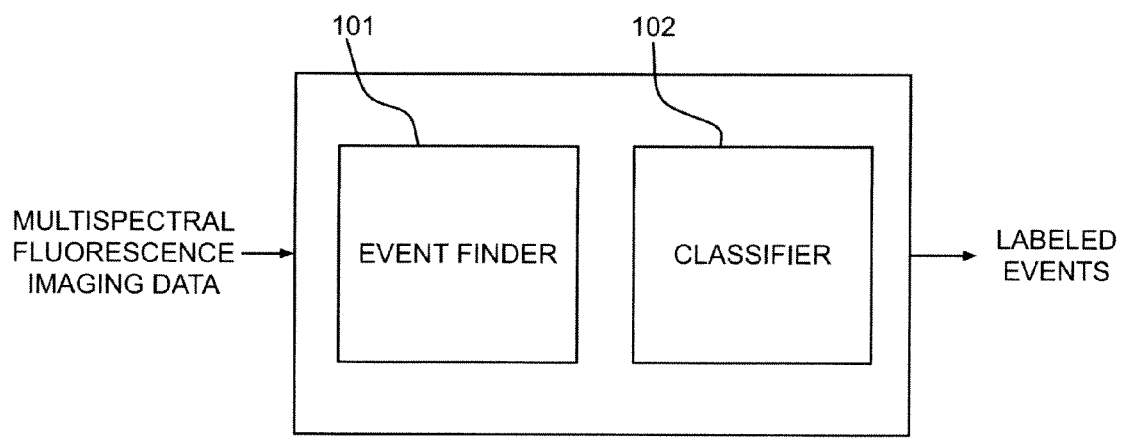
FIG. 1 is a diagram of a system for analyzing targets of interest in imaging data according to an embodiment of the present disclosure.

Referring to FIGS. 1 and 2 and event finding (201); an event finder (101) receives input data, e.g., multispectral fluorescence imaging data including W images, and locates groups of high-intensity pixels that might represent a positive TOI. Event finding is applied separately to each of the W images, acquired with filters at different wavelengths. For purposes of notation, consider a set S of wavelengths (filters) for which images are acquired (i.e., |S|=W) that is indexed by the variable s.

Referring to FIG. 3, to begin the event finding, a median filter with a small kernel (e.g., 3×3) is applied to a current image of the W images to remove stuck pixels, shot noise, etc. (301). Given this median filtered image, $M^s$, belonging to frequency s, a mean filter with a kernel width exceeding twice the target TOI size (measured in pixels) is applied to produce the filtered image $F^s$ that tracks illumination changes (e.g., caused by distance from the illumination source) and overall background level (302). A response of the mean filter is subtracted to remove the illumination changes and background levels. A transform is applied to compensate for illumination and provide a rough measure of signal-to-noise (S/N) that reflects human brightness perception (303). The transformation may be written as:

$$T_i^s = \log\left(\frac{M_i^s}{F_i^s}\right) \quad (1)$$

in which the subscript i is used to indicate the value corresponding to pixel i. Note that a small constant (e.g., 1e-10 is added to the denominator to prevent division by zero).

The values of $T^s$ are now thresholded to produce a binary version of $T^s$ (304), which is denote as $T_B^s$ by applying the threshold $$\Theta = \text{mean}(T^s) + \beta \text{variance}(T^s). \quad (2)$$

Morphological operators of erosion and dilation are then applied to clean each $T_B^s$ (305). Overlapping connected components of these binary masks across frequencies (i.e., for all $T_B^s$) are then considered collocated if the following two conditions are met (306):

1. The overlap exceeds percent of the largest connected component. An exemplary value of v=0.25.
2. None of the connected components in a single channel (wavelength) overlap with more than one connected component in another channel.

The event finder (101) outputs a list of labels, which are shared across all wavelength images identifying corresponding connected components. The collection of pixels in each wavelength channel corresponding to the same label is considered to be one event.

Referring now to classification (202) and FIG. 4, the event finder (201) located a set of events collocated across wavelength channels. Given this set of events, the classifier (102) determines if each event either indicates a TOI or represents noise. In order to make this determination, a training set of images is used. Due to the high number of events, manual classification of each event can be infeasible. However, given knowledge that certain sample specimens are "positive" (contain a TOI) or "negative" (do not contain a TOI), based on alternate diagnostic testing of the same specimen, training assumes that every event in a positive image represents a TOI while every event in a negative image does not represent a TOI. According to an embodiment of the present disclosure, given the training assumptions, a classification approach is described herein that tolerates label noise.

A feature vector is computed for each event by computing a series of measurements for an event across all wavelength images and concatenating these features into a single vector (401). Examples of features include brightness, blur and entropy. Assume that every training event is represented by a feature vector t and every test event is represented by vector v. A probability, x, is assigned to each vector that represents the probability that this event is a TOI (402). These probabilities can be assigned to the events in an image as follows:

1. Compute the inverse covariance matrix, C, of t.
2. Find the K-nearest neighbors (e.g., K=20) of each x and t, measured by the Mahalanobis distance (using C).
3. Treat the labels on t as boundary conditions ('1' if $t_i$ is from a positive specimen and '0' if $t_i$ is from a negative specimen) and solve for a combinatorial harmonic function, described below, to assign probabilities to each v of being a TOI.
4. Depending on the confidence tolerance, assign $t_i$ to 'positive' or 'negative' if $x_i$ exceeds a threshold.

This procedure was applied to the training/testing of sample specimens infected with Respiratory Syncytial Virus (RSV), where one fluorophore was used to identify total cell count in a sample and another fluorophore was used to identify the presence of the virus. The results obtained were classification rates representing 80% sensitivity (i.e., true positive rate) and >99% specificity (i.e., the false positive rate) of RSV-infected cells. These classification rates mirror the ability of current, manual, methods of counting of cells using a fluorescence microscope.

Referring to the combinatorial harmonic function, given a set of feature vectors that have been specified as belonging to L image labels, remaining feature vectors can be labeled by a multi-label harmonic potential segmentation method. For an arbitrary L, and an image or volume of arbitrary dimensions, consider a person at every voxel starting to walk randomly across the volume until meeting a labeled feature vector, hereafter a label. The expected percentage of random walkers that first reach a label i are denoted as $p_i$. If the walkers are biased to avoid crossing a sharp image gradient, such as an edge, to reach a neighboring voxel, the probability that a walker starting at a given pixel first strikes label i gives an indication of how strongly that feature vector belongs to label i. Once the set of $\{p_1, p_2, \ldots, p_L\}$ is determined for each voxel, that voxel may be assigned to a particular label by choosing the label with the highest probability, the i corresponding to $\max_i(p_i)$.

It is to be understood that the present disclosure may be implemented in various forms of hardware, software, firmware, special purpose processors, or a combination thereof. In one embodiment, the present disclosure may be implemented in software as an application program tangibly embodied on a program storage device. The application program may be uploaded to, and executed by, a machine comprising any suitable architecture.

Referring to FIG. 5, according to an embodiment of the present disclosure, a computer system 501 for identification of targets in multispectral imaging data the present disclosure can comprise, inter alia, a central processing unit (CPU) 502, a memory 503 and an input/output (I/O) interface 504. The computer system 501 is generally coupled through the I/O interface 504 to a display 505 and various input devices 506 such as a mouse and keyboard. The support circuits can include circuits such as cache, power supplies, clock circuits, and a communications bus. The memory 503 can include random access memory (RAM), read only memory (ROM), disk drive, tape drive, etc., or a combination thereof. The present disclosure can be implemented as a routine 507 that is stored in memory 503 and executed by the CPU 502 to process the signal from the signal source 508, e.g., a multispectral fluorescence imaging device inputting imaging data. As such, the computer system 501 is a general purpose computer system that becomes a specific purpose computer system when executing the routine 507 of the present disclosure.

The computer platform 501 also includes an operating system and micro instruction code. The various processes and functions described herein may either be part of the micro instruction code or part of the application program (or a combination thereof) which is executed via the operating system. In addition, various other peripheral devices may be connected to the computer platform such as an additional data storage device and a printing device.

It is to be further understood that, because some of the constituent system components and method steps depicted in the accompanying figures may be implemented in software, the actual connections between the system components (or the process steps) may differ depending upon the manner in which the present disclosure is programmed. Given the teachings of the present disclosure provided herein, one of ordinary skill in the related art will be able to contemplate these and similar implementations or configurations of the present disclosure.

Having described embodiments for identification of targets in multispectral imaging data, it is noted that modifications and variations can be made by persons skilled in the art in light of the above teachings. It is therefore to be understood that changes may be made in embodiments of the present disclosure that are within the scope and spirit thereof.

What is claimed is:

1. An imaging system for detecting targets of interest (TOIs) in multispectral imaging data comprising:
   a memory device storing a plurality of instructions embodying the system for detecting TOIs;
   a processor for receiving the multispectral imaging data and executing the plurality of instructions to perform a method comprising:
   determining a list of events collocated across images of the multispectral imaging data; and
   labeling each event as one of a TOI or non-TOI, wherein the events are emissions of fluorophore labeled structures, and wherein the labeling comprises:
   generating a filtered imaging data tracking illumination changes and overall background level in the multispectral imaging data;
   generating compensated imaging data by applying a transform to compensate for illumination in the filtered imaging data and provide a measure of signal-to-noise (S/N) that reflects a brightness perception; and
   outputting a binary mask, wherein overlapping connected components of the binary mask across frequencies are collocated and output as a list of labels shared across all images of the compensated imaging data, wherein the overlap exceeds a threshold percentage of a largest connected component and none of the connected components in a single channel overlap with more than one connected component in another channel.

2. The system of claim 1, wherein generating the filtered imaging data comprises applying a plurality of emission filters to each image to detect different emissions.

3. The system of claim 2, wherein groups of emissions are determined to be co-localized regions, wherein the emissions are classified to determine whether the co-localized regions of emissions represent TOIs.

4. The system of claim 2, wherein the filters comprise:
   a median filter applied to each image to determine a median filtered image; and
   a mean filter with a kernel width exceeding twice a target TOI size for determining a filtered image of the filtered imaging data, the filtered image having illumination changes and background levels removed.

5. The system of claim 4, further comprising a transform module executed by the processor for generating the compensated imaging data compensating for illumination and providing a measure of signal-to-noise (S/N) that reflects a brightness perception, wherein an output of the transform module is thresholded to output the binary mask.

6. The system of claim 1, wherein the labeling determines if each event either indicates a TOI or represents noise based on training data.

7. The system of claim 6, wherein a feature vector is computed for each event by computing a series of measurements for each event across all images and concatenating the series of measurements into a single vector.

8. The system of claim 7, wherein a probability is assigned to each feature vector that represents a probability that an event is a TOI, and labeling each feature vector according to a corresponding probability and a threshold for probability.

9. A non-transitory computer readable medium embodying instructions executable by a processor to perform a method for detecting targets of interest (TOIs) in multispectral imaging data, the method comprising:
   determining a list of events collocated across images of the multispectral imaging data; and
   labeling each event as one of a TOI or non-TOI, wherein the events are emissions of fluorophore labeled structures, and wherein the labeling comprises:
   generating a filtered imaging data tracking illumination changes and overall background level in the multispectral imaging data;
   generating compensated imaging data by applying a transform to compensate for illumination in the filtered imaging data and provide a measure of signal-to-noise (S/N) that reflects a brightness perception; and
   outputting a binary mask, wherein overlapping connected components of the binary mask across frequencies are collocated and output as a list of labels shared across all images of the compensated imaging data, wherein the overlap exceeds a threshold percentage of a largest connected component and none of the connected components in a single channel overlap with more than one connected component in another channel.

10. The computer readable medium of claim 9, wherein generating the filtered imaging data comprises applying a plurality of emission filters to each image to detect different emissions.

11. The computer readable medium of claim 10, wherein groups of emissions are determined to be co-localized regions, wherein the emissions are classified to determine whether the co-localized regions of emissions represent TOIs.

12. The computer readable medium of claim 10, wherein the application of the filters further comprises:
   applying a median filter to each image to determine a median filtered image; and
   subtracting a response of a mean filter with a kernel width exceeding twice a target TOI size for determining a filtered image of the filtered imaging data having illumination changes and background levels removed.

13. The computer readable medium of claim 9, wherein the labeling determines if each event either indicates a TOI or represents noise based on training data.

14. The computer readable medium of claim 13, wherein a feature vector is computed for each event by computing a series of measurements for each event across all images and concatenating the series of measurements into a single vector.

15. The computer readable medium of claim 14, wherein a probability is assigned to each feature vector that represents a probability that an event is a TOI, and labeling each feature vector according to a corresponding probability and a threshold for probability.

* * * * *